2,982,177
MAGAZINE SLIDE PROJECTOR HAVING PIVOTED INJECTOR AND EJECTOR ARMS AND AN ARCUATE SLIDE GUIDE

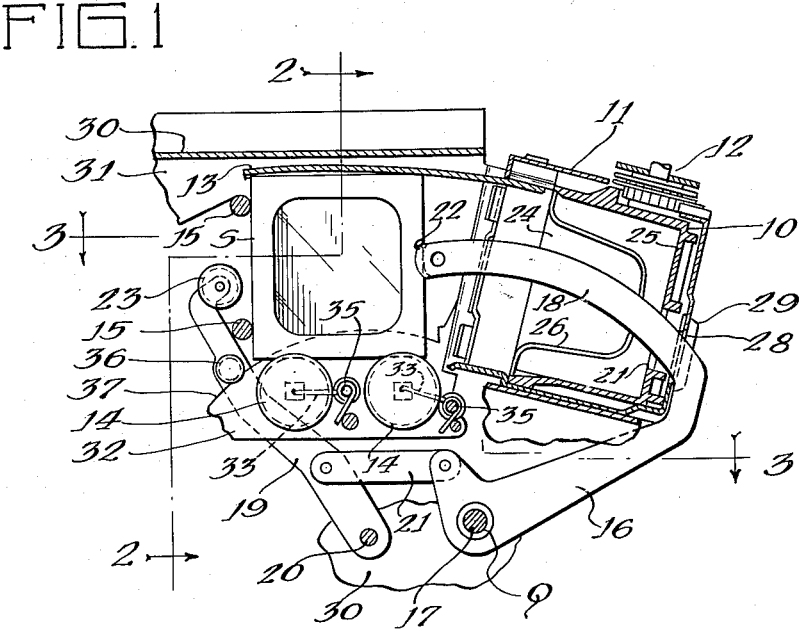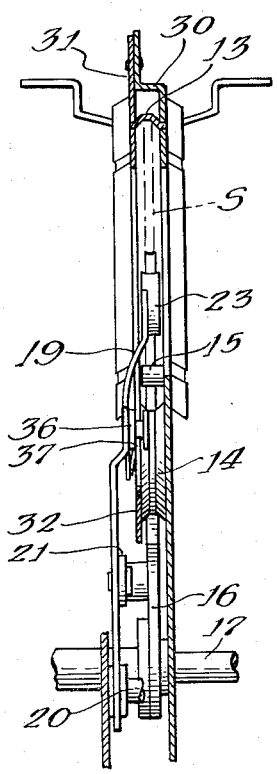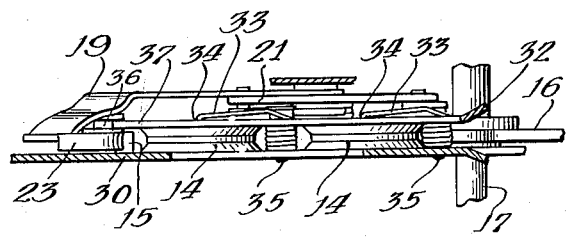

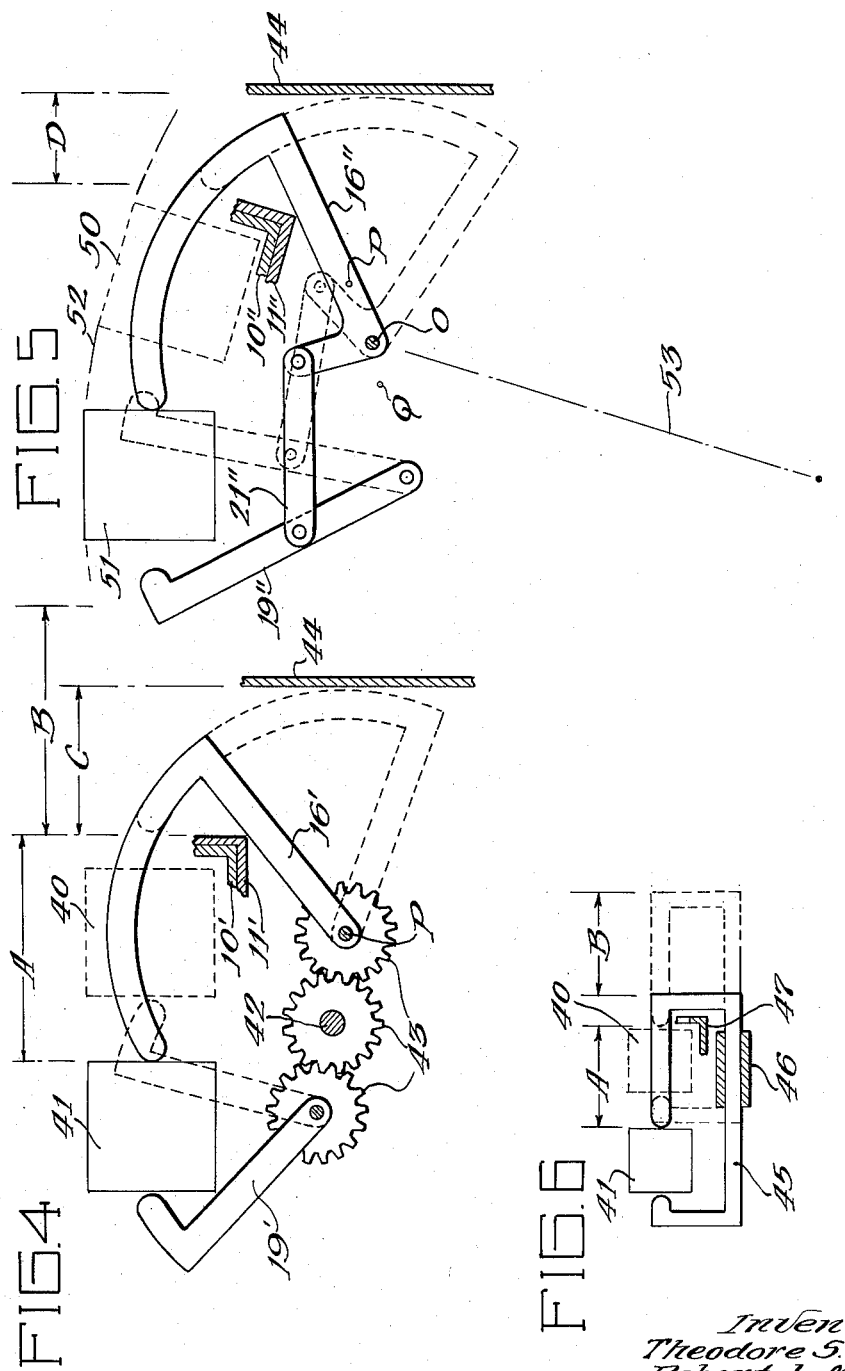

Theodore S. Briskin, Chicago, Robert L. Moore, La Grange Highlands, and Rudolph A. Rom, Stickney, Ill., assignors, by mesne assignments, to Revere Camera Company (formerly Samica Corporation), a corporation of Delaware Filed Jan. 30, 1956, Ser. No. 562,279

3 Claims. (Cl. 88—28)

This invention relates to slide transporting means for slide projectors of the magazine type, and is a continuation-in-part of our prior applications, Serial Nos. 495,474, filed March 21, 1955, now U.S. Patent No. 2,968,993, issued Jan. 24, 1961, and 545,068, filed November 4, 1955, now U.S. Patent 2,909,098, issued Oct. 20, 1959.

In the magazine type of slide projector, to which this invention pertains, a plurality of slides are contained in a magazine which is slidably mounted on or in the slide projector. The slide transporting mechanism causes the slides to be successively displaced from a magazine position into a projecting position, and then the slide is returned from the projecting position back to the magazine position at the conclusion of the projecting operation. Suitable means are provided for advancing the magazine so that a succeeding slide becomes aligned with the slide transporting mechanism.

It has heretofore been customary to construct a slide projector in such a manner that the magazine is mounted externally of the housing. According to the arrangement shown in the aforesaid copending applications, the projector housing is provided with a tunnel in which the magazine is slidably located; in other words, both the magazine and the slide transporting means are totally enclosed within the projector housing. In the enclosed type of construction, it is necessary to provide a clearance between the magazine tunnel and the outer wall of the casing, which clearance must be sufficiently large to accommodate the reciprocating slide transporting mechanism.

It is an object of the present invention to provide an improved slide transporting mechanism which requires a minimum amount of clearance. Thus, a more compact and commercially acceptable projector is provided, than would be the case if the enclosed type of construction were applied to slide transporting mechanism of the prior art.

It is another object of this invention to provide a slide projector in which the motion of the slide displacing elements is essentially rotational as contrasted with translational. Thus, the slide transporting mechanism can be conveniently actuated by a rock shaft which, in turn, may be oscillated either by a manual device, such as a lever, or by a motor.

The foregoing objectives are attained, in part, by the provision of separately pivoted slide displacing elements having a comparatively short radius, the arrangement being such as to very substantially reduce the clearance requirements as contrasted with the prior art type of mechanism.

A further object is to provide slide transporting mechanism in which the magazine is maintained in a slightly inclined position to the horizontal so that the return of the slide into its magazine position is assisted by gravity, thus facilitating design of the mechanism with respect to certain operating clearances.

Still another object is to provide improved slide path providing means, and improved means for maintaining the slide in its projecting position.

Other objects, features and advantages will become apparent as the description proceeds.

With reference now to the drawings in which like reference numerals designate like parts:

Fig. 1 is a front elevation of a preferred embodiment of our invention;

Fig. 2 is a vertical section taken along line 2—2 of Fig. 1;

Fig. 3 is a horizontal plan section taken along line 3—3 of Fig. 1;

Fig. 4 is a more or less diagrammatic view showing the principle of operation of the invention as applied to a modified form of the invention;

Fig. 5 is a similar view showing the principle of operation as applied to the embodiment of Figs. 1–3; and Fig. 6 is a diagrammatic view illustrating a prior type of device.

With reference now to Figs. 1–3, there is shown slide locating means defining an initial slide position, such as a magazine position, means defining a second slide position, such as a projecting position, and slide transporting means for displacing the slide from one to the other of said positions.

The means defining the initial slide position comprises a magazine 10 which is slidably mounted in a holder, or tunnel assembly 11, together with suitable means 12, such as a pawl and ratchet mechanism, for shifting the magazine 10 with respect to the tunnel assembly 11.

The means defining the second slide position comprises a guide strip 13 which engages the upper edge of a slide S, resiliently mounted elements 14 for engaging the lower edge of the slide S, and stop pins 15 for engaging the left edge of the slide S, as viewed in Fig. 1.

The slide transporting means comprises an ejector arm 16 mounted on a suitable shaft 17, for rotation about a center Q. The injector arm includes a transversely extending elongate portion 18, preferably arc-shaped.

The slide transporting mechanism also includes an ejector arm 19 mounted on a suitable shaft 20. A link 21 connects the injector and ejector arms so that oscillation of one or the other of the shafts 17 or 20 will cause oscillation of both arms.

The end, or the slide contacting portion, of the arc-shaped portion 18 of the injector arm 16 is provided with a concave edge 22 to facilitate engagement with the edge of the slide S. Similarly, a disk 23 having a concave edge is mounted on the upper end of the ejector arm 19 to provide proper engagement with the edge of the slide S.

Assuming that power is applied by causing oscillation of the shaft 17, it will be seen that the slide is displaced from the magazine 10 into engagement with the stop pins 15 by the injector arm 16, and that it is returned from the second or projecting position to the magazine 10 by the ejector arm 19.

The magazine 10, as pointed out in the aforesaid copending application, is a box-like structure having an open top side 24, a bottom wall 25, and side and end walls. The interior of the magazine is divided into a plurality of separate slide compartments by means of partitions 26. A slot 27 is formed in the bottom wall 25 through which the arc-shaped portion 18 of the injector arm extends. The tunnel assembly 11 is also provided with a slot 28 for receiving the arc-shaped portion 18. The edges of the slot 28, or suitable guide members 29 made of nylon, serve to guide the arc-shaped portion 18 and to impart stability to the injector arm 16 as a whole.

The injector arm 16 is shaped in the manner shown, that is, to include the arc-shaped portion 18, so as to provide means which can extend into and through the magazine 10 in connection with the slide displacing operation.

The lack of a corresponding slide enclosing structure in the second or projecting position renders unnecessary the provision of a corresponding arc-shaped portion on the ejector arm 19, although, of course, such can be provided if otherwise required.

The guide strip 13 is mounted between a main vertical plate 30, and an upper transverse vertical plate 31, as shown in Fig. 2. Similarly, the resiliently mounted elements 14, here shown as wheels, are disposed between the vertical plate 30 and a spaced lower plate 32, as shown in Fig. 3. The wheels are mounted on springs 33, the ends 34 of which are bent forwardly and extend through suitable openings in the plate 32, and which bent ends 34 serve as shafts upon which the wheels 14 can freely rotate.

The opposite ends of the springs 33 are wrapped around posts 35, and suitably anchored so that the wheels 14 will be biased upwardly against the lower edge of the slide S, thus urging the upper edge of the slide into engagement with the guide strip 13.

Stability is imparted to the ejector arm 19 by means of a flanged rivet 36 which projects from the ejector arm 19 and rides on an arcuate edge 37 of the lower plate 32. Thus, both arms are maintained in registry with the slide S, the ejector arm, by the elements 36 and 37; and the injector arm, by the slot edges or guide members 29.

As pointed out in the aforesaid copending application Serial No. 495,474, the shaft 17 is a rock shaft which is oscillated by a connection with a crank pin which is mounted on a continuously rotating drive gear. In adapting this slide mechanism to a power driven device, suitable overthrow mechanism, shown in said copending application but not shown herein, may be interposed between the rock shaft 17 and the injector arm 16.

In the alternative, as shown in the aforesaid copending application Serial No. 545,068, power may be applied by means of the shaft 20 on which the ejector arm is mounted, it being immaterial from the viewpoint of the operation of the slide transporting mechanism whether the power is applied to one shaft or the other.

Figs. 4, 5 and 6 illustrate the principles of the present invention in a somewhat simplified manner. In Fig. 4, the dotted rectangle 40 represents the initial slide position, and the solid line rectangle 41 illustrates the second slide position. The initial slide position is defined by the magazine 10' and the tunnel 11', only portions thereof being shown. In this embodiment of the invention the slide path is a rectilinear path. The slide is moved from position 40 to position 41 by means of injector arm 16' which rotates about center P, and is returned from position 41 to the magazine 10' by the ejector arm 19', all as described in connection with the Fig. 1 embodiment. In the Fig. 4 embodiment, the arms 16' and 19' have equal angular displacement, each moving through substantially 60°, since they are driven by means of a drive shaft 42 and gearing 43. The element 44 represents the wall of the housing which encloses the projector mechanism.

Fig. 6 represents a prior art type of device having rectilinearly displaced slide positions 40 and 41 in combination with slide displacing means in the form of a frame 45 which is slidably mounted in a suitable bearing 46. The operating distance, which is the distance through which the frame 45 must move, is designated by the letter A. The clearance, which is to say, the distance between the magazine 47 and the wall of the housing, if the ejector mechanism is to be enclosed by a housing, is represented by the letter B. In this prior art type of device, it will be seen that the clearance B is necessarily equal to the operating distance A.

With reference now to Fig. 4, the letter A designates the operating distance and the letter B designates an equivalent distance to the right thereof, representing the clearance required in the Fig. 6 type of prior art mechanism. The letter C represents the clearance actually required by the Fig. 4 type of slide transporting mechanism. Thus, the difference between the distances B and C in Fig. 4 represent the saving in clearance which is effected by the use of rotatable slide displacing means.

With reference now to Fig. 5, the reference numerals 50 and 51 represent the initial and the second slide positions, respectively, of a modified type of device. Here the two slide positions are angularly displaced, rather than being rectilinearly displaced, as is illustrated by the arc 52 and radius 53. Also shown in Fig. 5 is the magazine 10″, the tunnel 11″, the injector arm 16″, the ejector arm 19″, and the link 21″ which connects the injector and ejectors arms. The center, about which the injector arm 16″ rotates, is designated by the letter O. The letter P represents the point where the center would be located according to Fig. 4 type of construction. In other words, in Fig. 5 the provision of the curved slide path permits the center O to be located somewhat to the left of what it would otherwise be, other factors being equal. According to this modification, the clearance D is somewhat reduced over the clearance C which is required in the Fig. 4 type of construction.

The Fig. 1 type of construction also embodies the curved slide path, as is evident from the shape of the guide strip 13, but in the Fig. 1 construction the center about which the injector arm 16 rotates is located somewhat to the left of the position O in Fig. 5. The letter Q in Fig. 5 designates approximately the location of the center according to the Fig. 1 type of construction. It will thus be seen that by moving the center O even further to the left than is shown in Fig. 5, the clearance B can be still further reduced.

In the construction of Figs. 1 and 5, it will be observed that the magazine 10 or 10″, is disposed in a position inclined to the horizontal. Thus, referring to Fig. 5, it is not necessary for the ejector arm 19″ to engage the slide edge during the entire return stroke. In other words, the parts may be so timed that the stroke of the ejector arm 19″ is shorter than the stroke of the injector arm, as indicated by the dotted line positions in Fig. 5. Thus, the ejector arm is always clear of the slides, when in magazine position, and will not impede advance of the magazine, since final slide movement is due to gravity.

It will be observed in Fig. 1 that the wheels 14 are maintained in depressed position by the slide S. The flanged rivet 36, as shown in Fig. 2, is so located that it will engage and depress one or both of the wheels 14 as the ejector arm moves into its Fig. 1 position. This occurs just prior to the time that the lower leading corner of the slide engages the guide wheels 14. As a result, wear on the corner of the slide will be avoided, thus permitting the use of fairly strong springs 33 without causing damage to the slide. In other words, the flanged rivet 36 takes up a portion of the force which would otherwise be exerted by the resilient means on the slide during the movement of the slide into the second slide position, or projecting position.

Thus, the present invention provides slide transporting means having greatly reduced clearance requirements and which can be driven from a unidirectionally rotating drive member. By virtue of these two advantages, the present invention is well adapted for use in automatic slide projectors of the type shown in our aforesaid copending application, Serial No. 495,474.

The disclosure of said applications Serial Nos. 495,474 and 545,068 are hereby incorporated by reference into this application insofar as such disclosures are consonant with the subject matter of this application.

We claim:

1. In a slide projector, the combination of a slidably mounted magazine defining an initial slide position, stop means for defining a second position, said second position being vertically alined and said initial slide position being tilted and laterally offset therefrom, means providing a slide path connecting said initial and second slide positions, said last named means including a grooved arcuate guide strip extending from said magazine into said second slide position for engaging one edge of a slide as it moves from one to the other of said positions, and resiliently mounted means spaced from said guide strip for engaging the opposite edge of said slide for urging the same into engagement with said guide strip, a pivotally mounted injector arm for displacing the slide in one direction, said resiliently mounted means including a pair of wheels having concave edges and a resiliently mounted shaft for each wheel, a pivotally mounted ejector arm for displacing said slide in the opposite direction, and means for moving said ejector arm through a lesser distance than the distance through which said injector arm moves so that said ejector arm will not engage the slide edge during the final portion of the movement of the slide in order that the ejector arm will remain clear of a slide when in magazine position and will not impede advance of said magazine, the final portion of the return movement of said slide being effected by gravity.

2. In a slide projector including means for providing an optical axis, the combination of a slidably mounted magazine spaced from said optical axis, and means defining a slide projecting position which is intersected by said optical axis, a pivotally mounted injector arm having an elongate arcuate portion extending through said magazine for displacing a slide from said magazine into said projecting position, pivot means therefor, said magazine being laterally and angularly offset from said slide projecting position so as to permit said pivot means to be located closer to the vertical plane intersecting said optical axis than if said magazine were not angularly offset, thereby reducing the side clearance required by said injector arm, said position defining means including an arcuate shaped guide strip having a V-shaped cross section disposed above said projecting position for engaging the upper edge of a slide, and extending laterally to a point adjacent said magazine, and resilient means for engaging the lower edge of a slide when in projecting position, said resilient means comprising a spring mounted grooved roller biased upwardly into edge engaging position whereby said slide will be maintained in projecting position.

3. A slide projector as claimed in claim 2 including a pivotally mounted ejector arm, means for oscillating said two arms in unison, and means carried by said ejector arm for engaging said roller and displacing the same downwardly to take up a portion of the force exerted by said resilient means on said slide during movement of said slide into projecting position.

References Cited in the file of this patent
UNITED STATES PATENTS

| | | |
|---|---|---|
| 775,963 | Bentzon | Nov. 29, 1904 |
| 1,161,660 | Guerzoni et al. | Nov. 23, 1915 |
| 1,695,029 | Ryder | Dec. 11, 1928 |
| 2,221,753 | Bodie | Nov. 19, 1940 |
| 2,724,989 | Badalich | Nov. 29, 1955 |
| 2,748,653 | Pollan et al. | June 5, 1956 |
| 2,756,630 | Goldberg | July 31, 1956 |
| 2,909,962 | Goldberg | Oct. 27, 1959 |

FOREIGN PATENTS

| | | |
|---|---|---|
| 156,313 | Germany | Nov. 17, 1904 |
| 509,887 | Great Britain | July 19, 1939 |
| 1,061,808 | France | Dec. 2, 1953 |